US012728865B2

(12) United States Patent
Oguri et al.

(10) Patent No.: US 12,728,865 B2
(45) **Date of Patent: *Sep. 8, 2026**

(54) VEHICLE INCLUDING A VEHICLE PLATFORM THAT TRANSITIONS TO A WAKE MODE ACCORDING TO A WAKE COMMAND

(71) Applicant: TOYOTA JIDOSHA KABUSHIKI KAISHA, Toyota (JP)

(72) Inventors: Haruki Oguri, Toyota (JP); Go Tanaka, Toyota (JP); Kenichi Yamada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/314,404

(22) Filed: Aug. 29, 2025

(65) Prior Publication Data

US 2025/0388214 A1 Dec. 25, 2025

Related U.S. Application Data

(63) Continuation of application No. 18/652,080, filed on May 1, 2024, now Pat. No. 12,472,952.

(30) Foreign Application Priority Data

Jul. 11, 2023 (JP) ................................ 2023-113852

(51) Int. Cl.
*B60W 30/182* (2020.01)
*B60W 60/00* (2020.01)

(52) U.S. Cl.
CPC ........ *B60W 30/182* (2013.01); *B60W 60/001* (2020.02); *B60W 2520/10* (2013.01)

(58) Field of Classification Search
CPC ............. B60W 30/182; B60W 60/001; B60W 2520/10
See application file for complete search history.

(56) References Cited

U.S. PATENT DOCUMENTS 11,506,510 B1 11/2022 Wang
12,472,952 B2 * 11/2025 Oguri ................. B60W 30/182
2019/0300008 A1 10/2019 Ando
(Continued)

FOREIGN PATENT DOCUMENTS

JP 2019-177807 A 10/2019
KR 20210035052 A 3/2021

OTHER PUBLICATIONS

Ex Parte Quayle Action issued Jun. 16, 2025, in U.S. Appl. No. 18/652,080.

(Continued)

*Primary Examiner* — Edwin A Young
(74) *Attorney, Agent, or Firm* — Sughrue Mion, PLLC

(57) ABSTRACT

The vehicle includes a vehicle platform configured to receive commands related to autonomous driving from the autonomous driving kit. The autonomous driving kit is configured to transmit a wake command to the vehicle platform requesting transition of the power mode of the vehicle platform to the wake mode. The vehicle platform transitions to the wake mode by the wake command only when the propulsion direction status indicates parking and the vehicle speed is 0 km/h.

5 Claims, 6 Drawing Sheets

(56) References Cited

U.S. PATENT DOCUMENTS

| | | | | |
|---|---|---|---|---|
| 2023/0110042 | A1* | 4/2023 | Yamamoto .......... | B60W 60/001 701/22 |
| 2023/0116293 | A1* | 4/2023 | Ando ................ | B60W 60/0051 701/23 |
| 2024/0171944 | A1 | 5/2024 | Holler | |
| 2024/0221437 | A1 | 7/2024 | Knott | |
| 2025/0018951 | A1 | 1/2025 | Oguri | |

OTHER PUBLICATIONS

Notice of Allowance dated Sep. 9, 2025, issued in U.S. Appl. No. 18/652,080.

* cited by examiner 1
200
ADK
CONTROL REQUEST
VEHICLE CONDITION
100
VEHICLE PLATFORM
110
VEHICLE CONTROL INTERFACE BOX
125
ACTIVE SAFETY
130
INTEGRATED CONTROL MANAGER
Steering
Power-train
Brake
Body
122
123
121
126
120
129A
129B
129C
127A
127B
127C 1
200
AUTONOMOUS DRIVING KIT
ADS
RECOGNITION SENSOR
212
218
HMI
211
COMPUTER ASSEMBLY
213
ORIENTATION SENSOR
210
SENSOR CLEANER
216
COMPUTER MODULE 1
COMPUTER MODULE 2
211A
211B
100
VEHICLE PLATFORM
VEHICLE CONTROL INTERFACE BOX
VCIB 1
VCIB 2
111A
111B
110
120
120a
121
125
126
Brake 1
Brake 2
Steer 1
Steer 2
EPB
P Lock
PROPUL-SION
ACTIVE SAFETY
BODY
121A
121B
122A
122B
122
123
123A
123B
123C
126b
126a
BODY ECU
BODY ECU
...
BASE VEHICLE

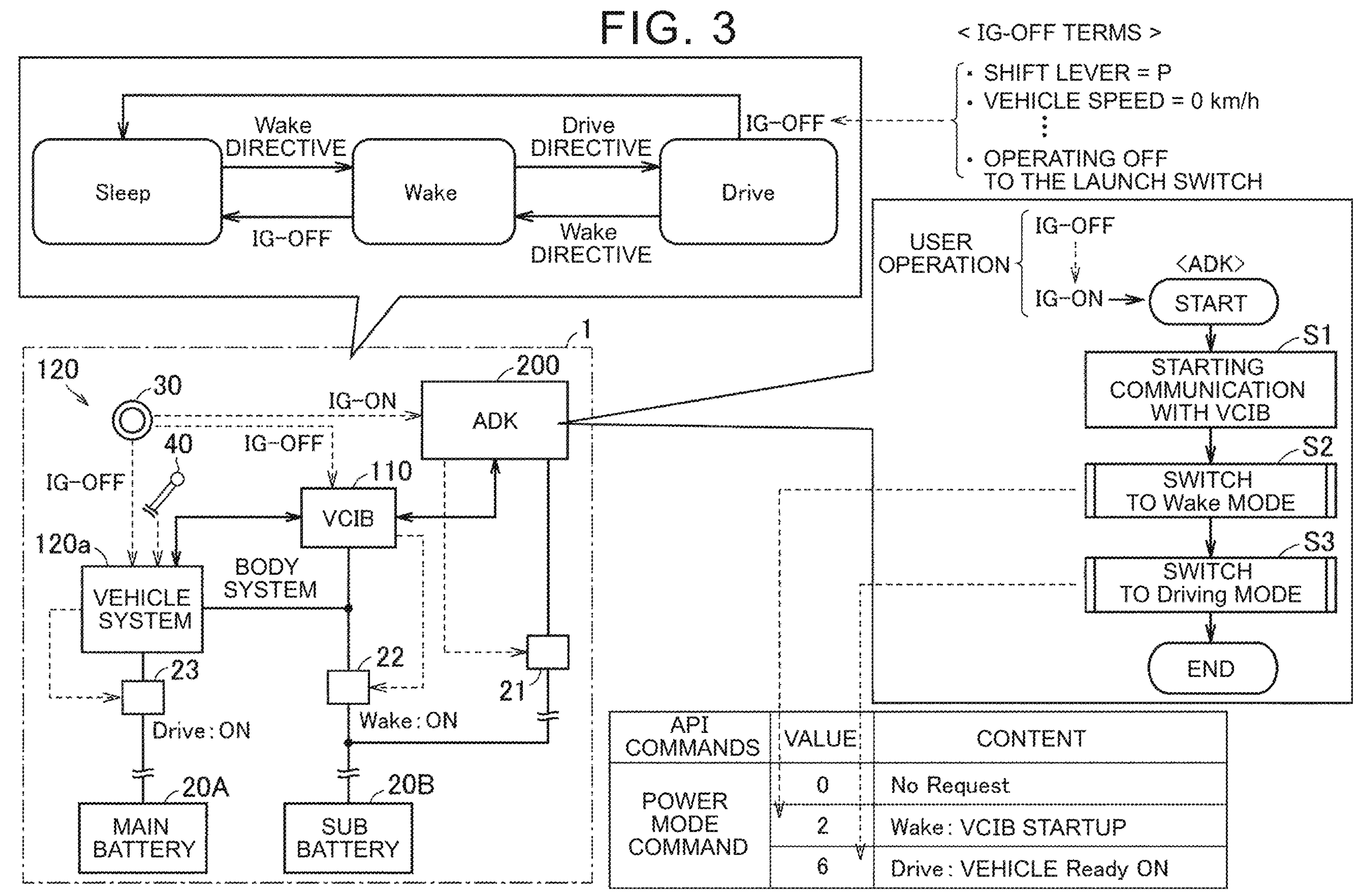
FIG. 3
Sleep
Wake DIRECTIVE
Wake
Drive DIRECTIVE
Drive
IG-OFF
IG-OFF
Wake DIRECTIVE
< IG-OFF TERMS >
· SHIFT LEVER = P
· VEHICLE SPEED = 0 km/h
⋮
· OPERATING OFF TO THE LAUNCH SWITCH
USER OPERATION
IG-OFF
IG-ON
〈ADK〉
START
S1
STARTING COMMUNICATION WITH VCIB
S2
SWITCH TO Wake MODE
S3
SWITCH TO Driving MODE
END
1
120
30
IG-ON
200
ADK
40
IG-OFF
IG-OFF
110
VCIB
120a
VEHICLE SYSTEM
BODY SYSTEM
23
22
21
Drive : ON
Wake : ON
20A
MAIN BATTERY
20B
SUB BATTERY
API COMMANDS
VALUE
CONTENT
POWER MODE COMMAND
0
No Request
2
Wake : VCIB STARTUP
6
Drive : VEHICLE Ready ON

FIG. 4

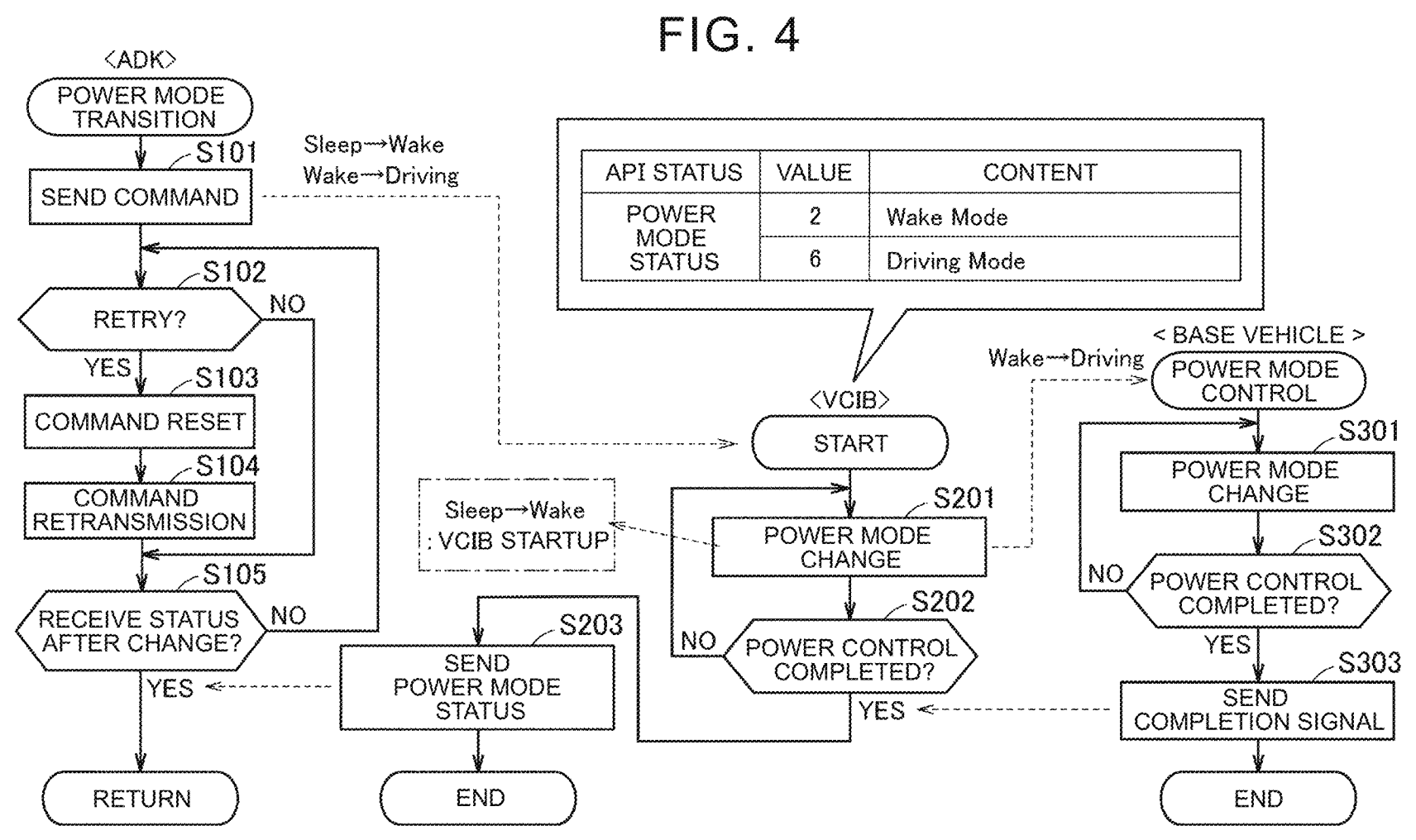

<ADK>
POWER MODE TRANSITION
S101 SEND COMMAND
Sleep→Wake
Wake→Driving
S102 RETRY?
YES
NO
S103 COMMAND RESET
S104 COMMAND RETRANSMISSION
S105 RECEIVE STATUS AFTER CHANGE?
YES
NO
RETURN

| API STATUS | VALUE | CONTENT |
| --- | --- | --- |
| POWER MODE STATUS | 2 | Wake Mode |
| | 6 | Driving Mode |

<VCIB>
START
S201 POWER MODE CHANGE
Sleep→Wake : VCIB STARTUP
S202 POWER CONTROL COMPLETED?
NO
YES
S203 SEND POWER MODE STATUS
END < BASE VEHICLE >
Wake→Driving
POWER MODE CONTROL
S301 POWER MODE CHANGE
S302 POWER CONTROL COMPLETED?
NO
YES
S303 SEND COMPLETION SIGNAL
END

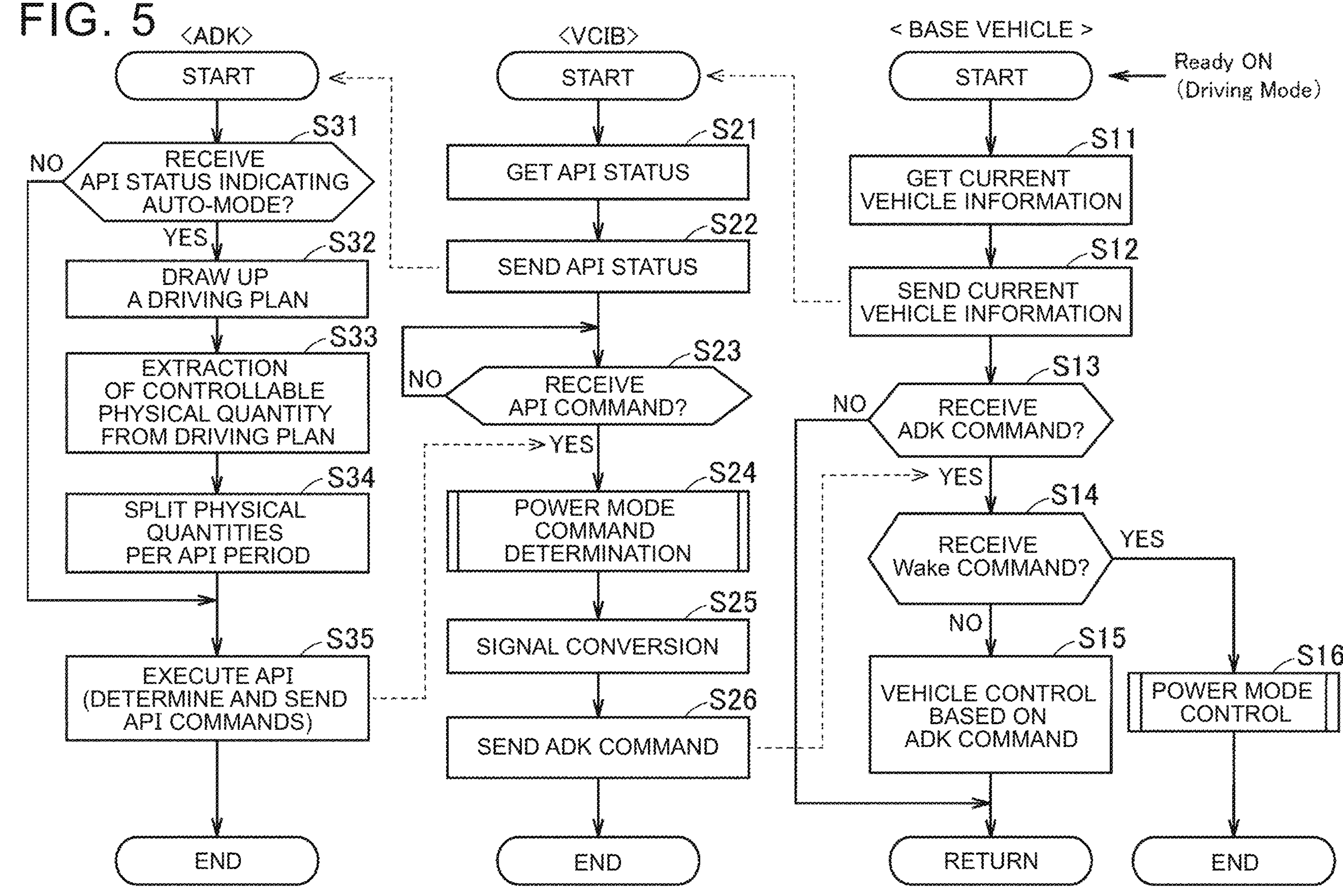
FIG. 5
<ADK>
START
S31
RECEIVE API STATUS INDICATING AUTO-MODE?
NO
YES
S32
DRAW UP A DRIVING PLAN
S33
EXTRACTION OF CONTROLLABLE PHYSICAL QUANTITY FROM DRIVING PLAN
S34
SPLIT PHYSICAL QUANTITIES PER API PERIOD
S35
EXECUTE API (DETERMINE AND SEND API COMMANDS)
END
<VCIB>
START
S21
GET API STATUS
S22
SEND API STATUS
S23
RECEIVE API COMMAND?
NO
YES
S24
POWER MODE COMMAND DETERMINATION
S25
SIGNAL CONVERSION
S26
SEND ADK COMMAND
END
<BASE VEHICLE>
Ready ON
(Driving Mode)
START
S11
GET CURRENT VEHICLE INFORMATION
S12
SEND CURRENT VEHICLE INFORMATION
S13
RECEIVE ADK COMMAND?
NO
YES
S14
RECEIVE Wake COMMAND?
YES
NO
S15
VEHICLE CONTROL BASED ON ADK COMMAND
S16
POWER MODE CONTROL
RETURN
END

VEHICLE INCLUDING A VEHICLE PLATFORM THAT TRANSITIONS TO A WAKE MODE ACCORDING TO A WAKE COMMAND

CROSS-REFERENCE TO RELATED APPLICATION

This application is a continuation of U.S. application Ser. No. 18/652,080, filed on May 1, 2024, which claims priority to Japanese Patent Application No. 2023-113852 filed on Jul. 11, 2023, incorporated herein by reference in its entirety.

BACKGROUND

1. Technical Field

The present disclosure relates to a vehicle capable of autonomous driving.

2. Description of Related Art

Japanese Unexamined Patent Application Publication No. 2019-177807 (JP 2019-177807 A) discloses a vehicle including an autonomous driving kit attached to a rooftop.

SUMMARY

A vehicle in which a power supply status varies according to a power mode is known. For example, power may be supplied to all the control devices mounted on the vehicle in a certain power mode, and power may be supplied to only some of the control devices in another power mode. The vehicle including the autonomous driving kit can execute vehicle control according to a command from the autonomous driving kit. Thus, it is conceivable to change the power mode of the vehicle according to a command from the autonomous driving kit. However, the autonomous driving kit may not always send a correct command. If an incorrect command is sent from the autonomous driving kit due to a software failure (e.g. a bug) of the autonomous driving kit, for example, in a vehicle in which the power mode is changed based on a command from the autonomous driving kit, the power mode of the vehicle may be changed in an inappropriate situation.

The present disclosure has been made in order to address the above issue, and an object thereof is to make it easy to change the power mode of a vehicle in an appropriate situation in a vehicle in which the power mode can be changed based on a command from an autonomous driving kit.

An aspect of the present disclosure provides a vehicle including a vehicle platform configured to be able to receive a command related to autonomous driving from an autonomous driving kit.

The vehicle platform includes a base vehicle including a plurality of first control devices and a vehicle control interface box including a second control device.

The first control devices include at least one body system control device.

The base vehicle further includes a shift lever.

The autonomous driving kit includes a third control device.

The second control device is configured to be able to communicate with both the first control devices and the third control device.

A power mode of the vehicle platform includes a sleep mode, a wake mode, and a driving mode. In the sleep mode, the first control devices and the second control device are in a power-off state. In the wake mode, the first control devices are not activated except for a predetermined body system control device, and the second control device is activated. In the driving mode, the first control devices and the second control device are in a power-on state.

The autonomous driving kit is configured to transmit, to the vehicle platform, a wake command that requests a transition of the power mode of the vehicle platform to the wake mode.

The vehicle platform transitions to the wake mode according to the wake command only when the shift lever indicates parking and a vehicle speed of the vehicle is 0 km/h.

According to the present disclosure, the power mode of a vehicle is easily changed in an appropriate situation in a vehicle in which the power mode can be changed based on a command from an autonomous driving kit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram for describing a power supply mode control method according to an embodiment of the present disclosure;

FIG. 4 is a flowchart for describing a power supply mode control method according to an embodiment of the present disclosure;

FIG. 5 is a flow chart for describing autonomous driving control of vehicles according to an embodiment of the present disclosure.

DETAILED DESCRIPTION OF EMBODIMENTS

Figure 1:
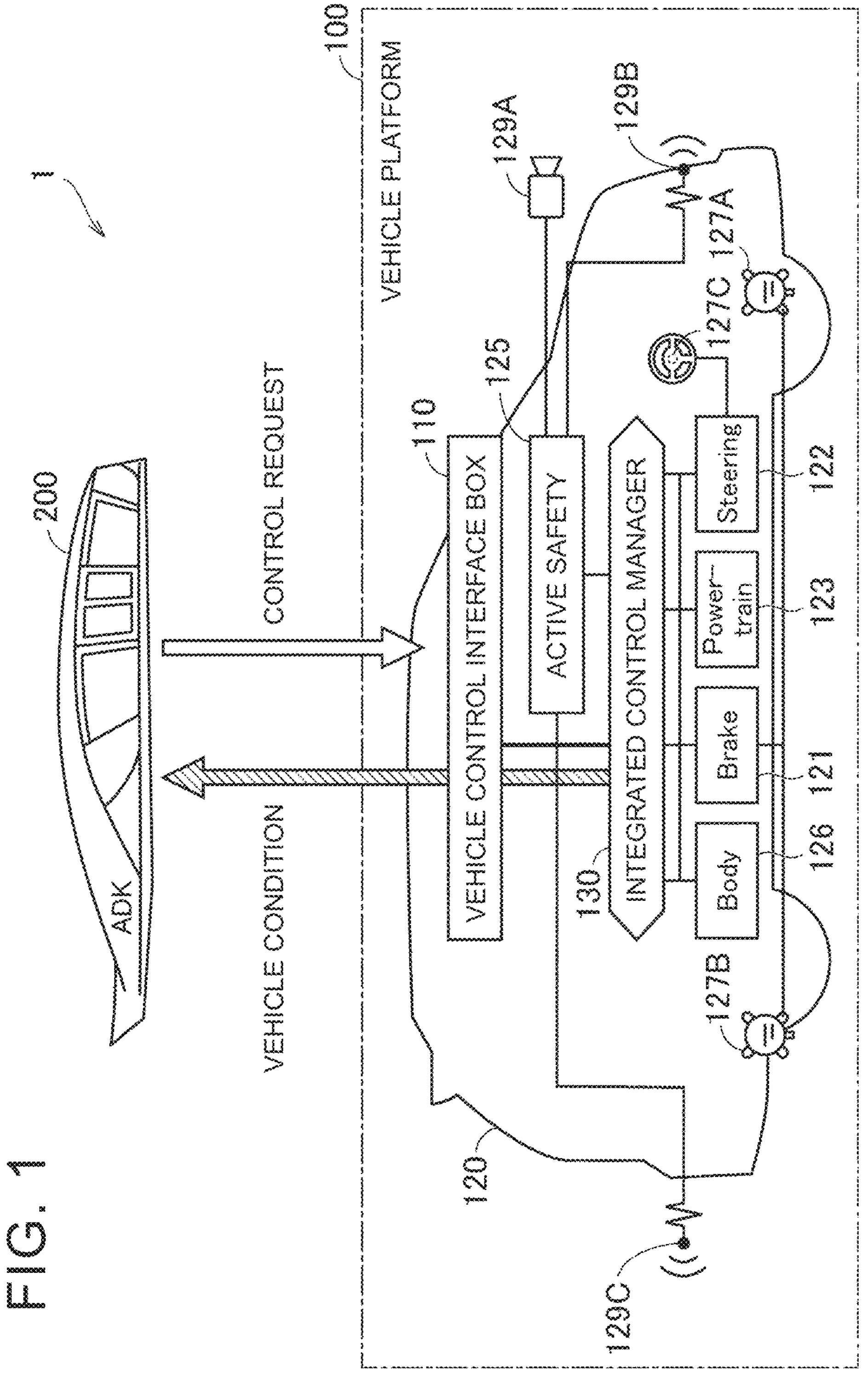
FIG. 1 is a diagram illustrating a schematic configuration of a vehicle according to an embodiment of the present disclosure.

Hereinafter, an embodiment of the present disclosure will be described in detail with reference to the drawings. In the drawings, the same or corresponding portions are denoted by the same reference signs and the description thereof will not be repeated.

FIG. 1 is a diagram illustrating a schematic configuration of a vehicle according to an embodiment of the present disclosure. Referring to FIG. 1, a vehicle 1 includes a vehicle platform (VP) 100 and an autonomous driving kit (ADK) 200. VP 100 includes a vehicle control interface box (VCIB) 110 and a base vehicle 120. By adding VCIB 110 to the base vehicle 120, a VP 100 to which ADK 200 can be attached and detached is formed. Then, the vehicle 1 is completed by attaching ADK 200 to VP 100. In this embodiment, a ADK 200 is attached to the rooftop of the base vehicle 120. However, the mounting position of ADK 200 can be changed as appropriate.

The base vehicle 120 is, for example, a commercially available electrified vehicle (EV). In this embodiment, battery electric vehicle (BEV) is employed as the base vehicle 120. However, the present disclosure is not limited thereto, and the base vehicle 120 may be a EV other than BEV. The base vehicle 120 includes an integrated control manager 130, various systems and various sensors (wheel speed sensor 127A, 127B, steering angle sensor 127C, and the like) for controlling the base vehicle 120, and a camera 129A and radar sensor 129B, 129C for the active safety system 125 to detect a crash risk. The integrated control manager 130 functions as a control device. The integrated control manager 130 integrates and controls various systems related to the operation of the base vehicle 120 based on the detection result of the in-vehicle sensor.

Figure 2:
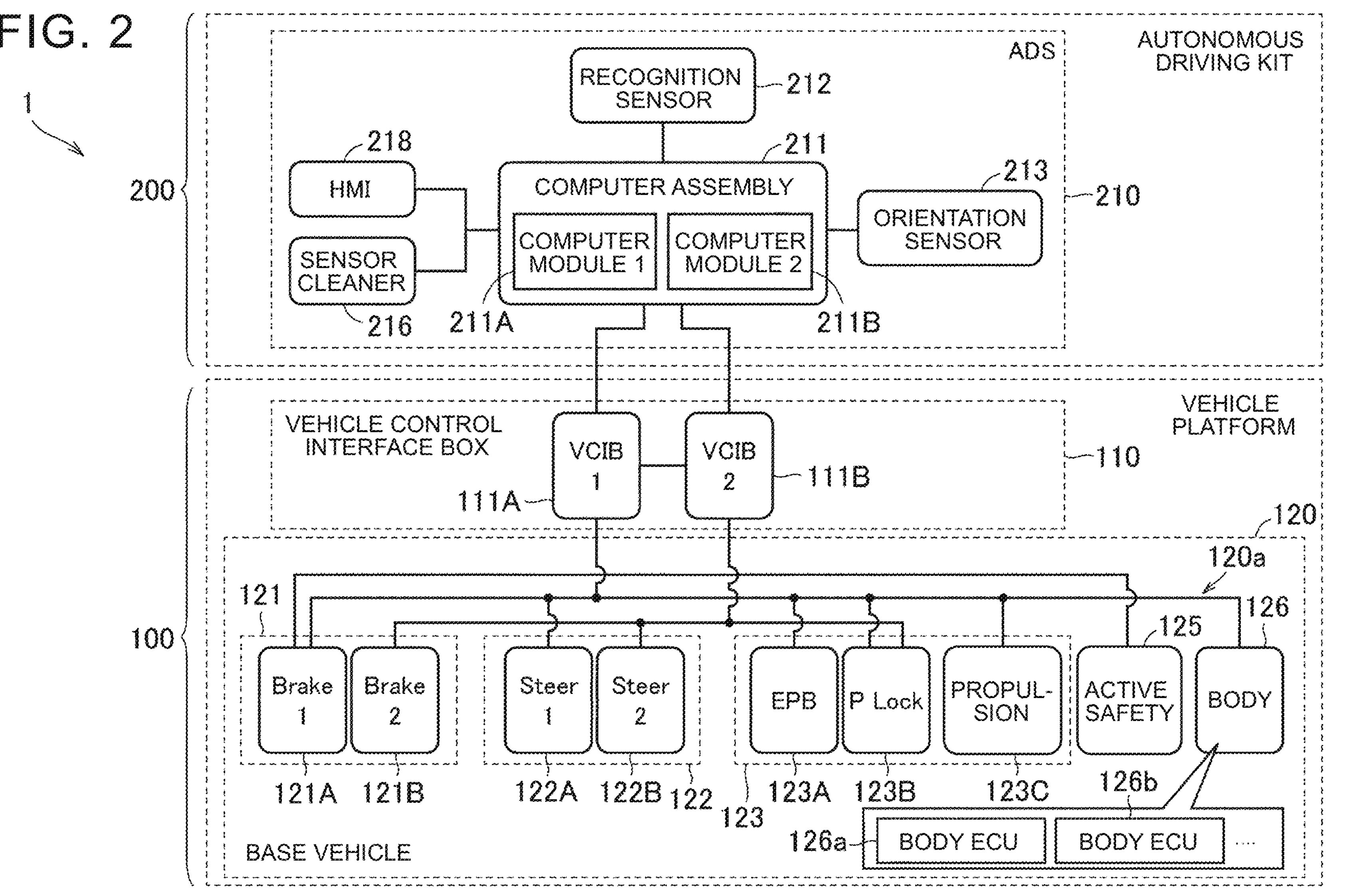
FIG. 2 shows details of the control system of the vehicle shown in FIG. 1.

FIG. 2 is a diagram illustrating details of a control system of the vehicle 1. Referring to FIG. 2 together with FIG. 1, ADK 200 includes an autonomous driving system (hereinafter referred to as "ADS") 210 for performing autonomous driving of the vehicle 1. ADS 210 includes a computer assembly (hereinafter referred to as "ADSCOM") 211, a recognition sensor 212, an attitude sensor 213, a sensor cleaner 216, and a Human Machine Interface (HMI) 218.

ADSCOM 211 includes a computer module (hereinafter referred to as "ADC") 211A, 211B. Each of ADC 211A, 211B includes a processor and a storage device that stores autonomous driving software using an API, which will be described later, and is configured to be capable of executing autonomous driving software by the processor. The recognition sensor 212 acquires environment information indicating an external environment of the vehicle 1. The recognition sensor 212 may include at least one of a camera, a millimeter wave radar, and a lidar. The attitude sensor 213 acquires attitude information regarding the attitude of the vehicle 1. The attitude sensor 213 may include various sensors for detecting acceleration, angular velocity, and position of the vehicle 1. HMI 218 includes an inputting device and a notification device.

The base vehicle 120 includes a vehicle system **120*a*. The vehicle system 120*a* comprises a brake system 121, a steering system 122, a powertrain system 123, an active safety system 125, and a body system 126**. In this embodiment, the electronic control unit (hereinafter also referred to as "ECU") is provided.

VCIB 110 is configured to communicate with both the base vehicle 120 and ADK 200 via communication busses. These physical communications may be communications using Controller Area Network (CAN). In the vehicle 1, a control system related to the behavior (running, stopping, and bending) of the vehicle 1 has redundancy. ADC 211A, 211B gives instructions to the main-control system and the sub-control system, respectively. VCIB 110 includes a VCIB 111A (a control unit of a main control system) and a VCIB 111B (a control unit of a sub-control system). Each control unit may include a computer including a processor and a storage device. VCIB 111A and 111B may be in direct communication with the respective systems, or may be in communication via the integrated control manager 130 shown in FIG. 1.

The brake system 121 includes a brake mechanism, an operation unit that receives a brake operation from a driver, and a brake control unit 121A, 121B. The steering system 122 includes a steering mechanism, an operation unit that receives a steering operation from a driver, and a steering control unit 122A, 122B. The powertrain system 123 includes a shifting device, a vehicle driving device, an EPB device, an P-Lock device, an EPB controller 123A, a P-Lock controller 123B, and a propulsion controller 123C. "EPB" means electric parking brake and "P-Lock" means parking lock. The shift device determines the shift range and switches the propulsion direction and the shift mode of the base vehicle 120 according to the determined shift range. The shift device further includes, in addition to the transmission mechanism, an operation unit that receives a shift operation from the driver. The vehicle driving device applies a propulsive force in a propulsion direction indicated by the shift range. The vehicle driving device includes a main battery and a traveling motor that is supplied with electric power from the main battery. The vehicle driving device further includes an accelerator pedal operated by a driver to accelerate the vehicle 1. P-Lock device further includes an operation unit configured to receive a parking operation from the driver in addition to the parking lock mechanism and the actuator.

The body system 126 includes a body system component (for example, a direction indicator, a horn, and a wiper) and a body system control device (body system ECU) that controls the body system component. In the manual mode, the body ECU controls the body system component according to the user's manipulation, and in the automated mode, controls the body system component according to a command from ADK 200. In this embodiment, the body system 126 includes a plurality of body system control devices (including body system ECU **126*a* and 126*b***). However, the number of the body system control devices is arbitrary, and may be one.

In this embodiment, the respective control devices included in the base vehicle 120 (vehicle system **120*a*) correspond to an exemplary "first control device" according to the present disclosure. Further, each of VCIB 111A, 111B functions as a "second control device" according to the present disclosure. Each of ADC 211A, 211**B functions as a "third control device" according to the present disclosure.

FIG. 3 is a diagram for explaining a power supply mode control method according to the embodiment. In FIG. 3, the base vehicle 120 includes a vehicle system **120*a*, a battery 20A, 20B, switch circuits 21 to 23, an activation switch 30, and a shift lever 40. The activation switch 30 receives a user operation for switching between activation and deactivation of the system. In general, the start-up switch of a vehicle is referred to as a "power switch" or an "ignition switch" or the like. The shift lever 40 corresponds to an operation unit of the shift device described above. The shift lever 40 designates a shift range in response to a shift operation from the driver. The shift range of the vehicle 1** includes parking (P), reverse (R), neutral (N), and drive (D).

The battery 20A is a main battery included in the above-described vehicle-driven device. The battery 20B is an auxiliary battery. The capacity of the main battery is larger than the capacity of the auxiliary battery (sub battery). The control devices included in the vehicle 1 according to this embodiment are supplied with electric power from at least one of the battery 20A and the battery 20B. However, such a power supply configuration is merely an example. For example, ADC 211A, 211B (third control device) may be supplied with electric power from a power storage device mounted on ADK 200.

VP 100 power supply includes a Sleep Mode, a Wake Mode, and a Driving Mode.

In sleep mode, VP 100 is turned OFF (vehicular power OFF). In this condition, there is no power supply from the main battery (battery 20A) to the respective systems. VCIB and the rest of ECU are not activated. That is, in the sleep mode, all the control devices included in the vehicle system 120*a* and all the control devices included in VCIB 110 are turned off.

In wake mode, VCIB is activated. In this condition, there is no power supply from the main battery (battery 20A), and ECU other than VCIB is not activated except for a part of the body system ECU. That is, in the wake mode, each control device included in the vehicle system 120*a* is not activated except for a part of the body system ECU (predetermined body system control device), and each control device (VCIB 111A, 111B) included in VCIB 110 is activated by power supply from an auxiliary battery (battery 20B). The predetermined body system control device may be a body system ECU 126*a* (FIG. 2) or may include a plurality of body system ECU.

In the running mode, VP 100 is turned ON (vehicular power supply ON). In this condition, electric power is supplied from the main battery (battery 20A) to the entire VP 100. That is, in the driving mode, all the control devices included in the vehicle system 120*a* and all the control devices included in VCIB 110 are turned on.

In the driving mode, the vehicle system 120*a* communicates with ADK 200 via VCIB 110. A signal (API signal) defined by Application Program Interface (API) is used for communication between ADK 200 and VCIB 110. ADK 200 is configured to process various types of signals defined in API. ADK 200 outputs various commands (API commands) defined by API to VCIB 110. ADK 200 also receives from VCIB 110 various signal (API status) indicative of the status of the base vehicle 120. Both API and API statuses correspond to API.

In this embodiment, ADK 200 uses API commands described below.

The power mode command is an API command requesting control of the power mode of VP 100. In the power mode command, one of a value "O" (first value) indicating No Request, a value "2" (second value) requesting the transition to the wake mode, and a value "6" (third value) requesting the transition to the in-operation mode is set. Hereinafter, the power mode commands indicating the values "2" and "6" are referred to as "Wake command" and "Drive command", respectively.

The vehicular mode command is an API command requesting a transition to an automated mode or a manual mode. The propulsion direction command is an API command requesting switching of a shift range (R/D). In the propulsion direction command, one of a value "0" indicating a No Request, a value "2" requesting a change to the reverse (R) range, and a value "4" requesting a change to the drive (D) range is set. The shift range can be switched according to the propulsion direction command only when the traveling direction status described later indicates a stop. The acceleration command is an API command for instructing the acceleration of the vehicle. The acceleration command requests acceleration (+) and deceleration (−) with respect to a direction indicated by a propulsion direction status to be described later. The immobilization command is an API command requesting application or removal of immobilization. The application of immobilization means that EPB is in ON state (operating state) and the shift range is in the P (parking) state.

Some API commands used in the vehicle 1 have been described above. VCIB 110 receives various API commands from ADK 200. Upon receiving API command from ADK 200, VCIB 110 converts API command into a form of a signal executable by the controller of the base vehicle 120. Hereinafter, API command converted into the format of the signal executable by the control device of the base vehicle 120 is also referred to as an "in-house command". When VCIB 110 receives API command from ADK 200, it outputs an inside command corresponding to API command to the base vehicle 120.

Next, API status will be described. ADK 200 grasps the status of the base vehicle 120 using, for example, API status described below.

The power mode status is an API status indicating the status of VP 100 power mode. In the power mode status, one of a value "2" indicating the wake mode and a value "6" indicating the in-operation mode is set.

The vehicle mode status is an API status indicating a vehicle mode status. The vehicle mode includes a manual mode, an automatic mode, and a standby mode. The manual mode is a vehicle mode in which the vehicle is under the control of a driver (human). The automatic mode is a vehicle mode in which the vehicle platform (including the base vehicle) is under control of the autonomous driving kit. The standby mode is a vehicle mode in which movement of the vehicle is prohibited. In the initial state, the vehicle mode is the manual mode. The driver can select a desired vehicle-mode through the in-vehicle HMI. The base vehicle 120 determines the vehicle mode in consideration of the situation of the vehicle 1 and the selection of the driver. The vehicle mode status outputs corresponding values "0", "1", and "2" when the current vehicle mode is the manual mode, the automatic mode, and the standby mode, respectively.

The traveling direction status is an API status indicating a traveling direction of the vehicle. In the traveling direction status, a value "0" is output when the vehicle moves forward, and a value "1" is output when the vehicle moves backward. When all of the wheels (four wheels) indicate the vehicle speed "0" for a certain period of time, the traveling direction-status outputs a value "2" indicating Standstill. The vehicle speed status is an API status indicating a vertical speed of the vehicle. The vehicle speed (longitudinal speed of the vehicle) may be an estimate. The vehicle speed status outputs an absolute value of the vehicle speed. That is, the vehicle speed status outputs a positive value even when the vehicle moves backward.

The propulsion direction status is an API status indicating the present shift range. The propulsion direction status outputs corresponding values "1", "2", "3", and "4" when the current shift range is P, R, N, and D, respectively. When the present shift range is undefined, the propulsion direction status is "7" (Invalid Value). The shift lever status is an API status indicating the status of the shift lever 40. The shift lever status outputs corresponding values "1", "2", "3", and "4" when the current position of the shift lever 40 is P, R, N, and D, respectively. When the present state of the shift lever 40 is undefined, the shift lever status is "7" (Invalid Value). The shift lever intervention status is an API status indicating whether or not the driver has operated to change the position of the shift lever 40. In the automatic mode, the shift lever operation by the driver is not accepted.

Some API statuses used in the vehicle 1 have been described above. VCIB 110 receives various sensor detection values and state determination results from the base vehicle 120, and outputs various API statuses indicating the state of the base vehicle 120 to ADK 200. VCIB 110 acquires API status in which the status indicating the status of the base vehicle 120 is set, and outputs the obtained API status to ADK 200.

Each of the switch circuits 21 to 23 is configured to switch the connection/disconnection of the electrical circuit. Each of the switch circuits 21 to 23 may include an electromagnetic relay. Each of the switch circuits 21 to 23 may include DC/DC converters. The battery 20B supplies power to ADK 200 (ADC 211A, 211B) via the switch circuit 21. The state (connection/disconnection) of the switch circuit 21 is switched according to the state (activation/deactivation) of the activation switch 30. Even if each of ADC 211A, 211B is stopped, an activation request from the activation switch 30 acts on the switch circuit 21 by an on-operation to the activation switch 30, and the switch circuit 21 is switched from the cutoff state (open) to the connected state (closed). The battery 20B supplies electric power to each of a predetermined body system ECU (hereinafter, referred to as "wake ECU") that is activated in the wake mode and a VCIB 111A, 111B via the switch circuit 22. Even if each of VCIB 111A, 111B is stopped, the switch circuit 22 is switched from the cutoff state (open) to the connected state (closed) by Wake command from ADK 200. The battery 20A supplies power to the vehicle system 120*a* via switch circuit 23. Even when the vehicle system 120*a* is stopped, the switch circuit 23 is switched from the cutoff state (open) to the connected state (closed) by a Drive command from ADK 200.

In the sleep mode, all of the switch circuits 21 to 23 are turned off. In the wake mode, the switch circuits 21, 22, 23 are connected, connected, and disconnected, respectively. In the operation mode, all of the switch circuits 21 to 23 are in the connected state.

The state (activation/deactivation) of the activation switch 30 is switched in response to a user operation. Hereinafter, the state in which the activation switch 30 indicates the activation is referred to as "IG-ON", and the state in which the activation switch 30 indicates the deactivation is referred to as "IG-OFF". A user operation (hereinafter referred to as "OFF operation") that turns the activation switch 30 OFF turns IG-OFF. However, OFF operation is valid only when a predetermined OFF condition is satisfied, and OFF operation is invalid when OFF condition is not satisfied. OFF condition includes that the shift lever 40 designates parking (hereinafter, referred to as "first requirement"), that the vehicle speed of the vehicle 1 is 0 km/h (hereinafter, referred to as "second requirement"), and that the shift range indicates parking (hereinafter, referred to as "third requirement"). When the user performs an OFF operation on the activation switch 30 while OFF condition is satisfied, an IG-OFF occurs. Neither the acceleration control nor the shift change (shift range change) of the vehicle 1 is performed in IG-OFF. Therefore, the first to third requirements are satisfied in IG-OFF. The power mode of VP 100 shifts to the sleep mode by operating a valid OFF to the activation switch 30.

When the activation switch 30 indicates stopping, the shift lever 40 indicates parking (P) and the power mode of VP 100 is the sleep mode while the vehicle speed of the vehicle 1 is 0 km/h. When the activation switch 30 indicates a deactivation, no communication is performed between ADK 200 and VCIB 110. When the activation switch 30 is switched from IG-OFF to IG-ON, ADK 200 executes S1 to S3 process flow. When the activation switch 30 is turned on, the first and second requirements are met. This process is basically executed by ADC 211A. However, when an error occurs in ADC 211A, ADC 211B may be executed instead of ADC 211A. Hereinafter, each step in the flowchart will be referred to as "S".

In S1, ADK 200 initiates communication with VCIB 110. In IG-OFF, since the communication between the two devices is stopped, it is possible to prevent the power consumption of the vehicle 1 from being lost due to the power consumption by the communication. In the following S2, ADK 200 sends a Wake command to VCIB 110. VP 100 shifts the power mode to the wake mode in response to a Wake command from ADK 200. In the following S3, ADK 200 sends a Drive command to VCIB 110. VP 100 shifts the power supply mode to the in-operation mode in response to Drive command from ADK 200.

FIG. 4 is a flowchart for explaining a power supply mode control method according to this embodiment. Referring to FIG. 4, in each of S2 and S3 illustrated in FIG. 3, ADK 200 executes S101 to S105 process sequence. Further, VCIB 110 executes S201 to S203 process flow. This process is basically executed by VCIB 111A. However, when an error occurs in VCIB 111A, VCIB 111B may be executed instead of VCIB 111A. In addition, a plurality of control devices (for example, the integrated control manager 130 illustrated in FIGS. 1 and 2 and the control devices of the respective systems) included in the base vehicle 120 execute S301 to S303 processes.

In S101, ADK 200 transmits a power mode command (S2: Wake command, S3: Drive command) to VCIB 110. If ADK 200 invokes VCIB 110, ADK 200 may periodically send a Network-Managed (NM) frame using CAN. When VCIB 110 receives the power mode command, S201 to S203 process flow is started. In S201, VCIB 110 executes a process according to the power mode command. In S202, VCIB 110 determines whether or not the power mode control according to the power mode command is completed. For example, a stopped VCIB 110 may be activated upon receipt of a Wake command. When VCIB 110 is activated (YES in S202), VCIB 110 transmits a power mode status indicating a wake mode (value "2") to ADK 200 in S203. On the other hand, when VCIB 110 receives Drive command in the wake mode, VCIB 110 transmits an in-vehicle command corresponding to Drive command to the base vehicle 120 (S201). When the base vehicle 120 receives this command, S301 to S303 process is started. In S301, the base vehicle 120 performs power mode control according to a power mode command. In S302, the base vehicle 120 determines whether the power-supply-mode control according to the power-supply-mode command is completed. When the transition from the wake mode to the in-operation mode is completed in accordance with Drive command (YES in S302), the base vehicle 120 transmits a completion signal indicating completion of the power-supply mode control to VCIB 110 in S303. When VCIB 110 receives this completion signal (YES at S202), VCIB 110 sends a power mode status to ADK 200 at S203 indicating an in-operation mode (value "6").

After transmitting the power mode command in S101, ADK 200 determines whether or not the retry condition is satisfied in the subsequent S102. In this embodiment, even after a predetermined time (for example, 4 seconds) has elapsed since ADK 200 transmitted the power mode command, the retry condition is satisfied when ADK 200 does not receive the power mode status indicating that the power mode change according to the power mode command has been performed. When the retry condition is satisfied (YES in S102), ADK 200 sets the value "0" in the power mode command in S103, then sets the value "2" (S2) or the value "6" (S3) again, and transmits the power mode command (S2: Wake command, S3: Drive command) to VCIB 110 again in S104. Thereafter, the process proceeds to S105. When the retry condition is not satisfied (NO in S102), the process proceeds to S105 without executing the retry (S102 to S104).

In the above-described control, when ADK 200 requests the change of the power mode and the change of the power mode is not executed, not only the power mode command is transmitted but also the setting of the command is retried. This facilitates the transmission of accurate commands to the base vehicle 120. According to the above-described control, the power supply mode change requested by ADK 200 can be more reliably executed.

S105 determines whether ADK 200 has received a power mode status (S203) indicating that a power mode change has been made in accordance with a power mode command. If it is determined that ADK 200 has not received the power mode status (NO at S105), the process returns to S102. When it is determined that ADK 200 has received the power mode status (YES in S105), the process returns to the main routine (the process flow illustrated in FIG. 3).

FIG. 5 is a flowchart for explaining the automatic driving control of the vehicle 1 according to this embodiment. When the power supply mode of VP 100 becomes the in-operation mode, the control device (first control device) included in the vehicle system 120*a* starts S11 to S16 process flow.

Referring to FIG. 5, in S11, the base vehicle 120 acquires the present vehicle data. In a subsequent S12, the base vehicle 120 transmits the obtained vehicle data to VCIB 110. The current vehicle information includes various sensor detection values indicating the current state of the base vehicle 120 and a state determination result based on a user operation or a sensor detection value. After transmitting the vehicle data, the base vehicle 120 determines whether or not a command (ADK command) from ADK 200 has been received in S13. While the base vehicle 120 does not receive ADK command (NO in S13), S11 to S13 is repeated and the process does not proceed to S14.

The process flow of S21 to S26 is executed by VCIB 110 (VCIB 111A or 111B). When VCIB 110 receives the present vehicle data from the base vehicle 120, it starts a process flow. In S21, VCIB 110 obtains various API statuses indicating the status of the current base vehicle 120 based on the current vehicle data. VCIB 110 may determine values of various API statuses based on various sensor detected values. In the following S22, VCIB 110 transmits various API statuses acquired by S21 to ADK 200. Thereafter, VCIB 110 waits for an API command while determining whether an API command has been received from ADK 200 in S23. While VCIB 110 does not receive API command (NO in S23), the process does not proceed to S24.

The process flow of S31 to S35 is executed by ADK 200 (ADC 211A or 211B). Upon receiving API status from VCIB 110, ADK 200 starts a process flow. In S31, ADK 200 determines whether the received vehicular mode status indicates the auto mode. When the vehicle-mode status indicates the auto-mode (YES in S31), ADK 200 creates a travel plan on the basis of the detection results (for example, environmental information and attitude information) of the various sensors and API status acquired from VCIB 110 in S32. The travel plan is data indicating the behavior of the target vehicle 1 in a predetermined period. ADK 200 may calculate the behavior (vehicle speed, attitude, and the like) of the vehicle 1 and create a travel plan suitable for the condition of the vehicle 1 and the external environment. In the following S33, ADK 200 extracts a control physical quantity (acceleration, tire-breaking angle, and the like) from the travel plan created by S32. In the following S34, ADK 200 divides the physical quantity extracted by S33 for each API cycle. Then, ADK 200 obtains an autonomous driving command (the value of various API commands) for realizing the physical quantity according to the traveling plan, based on the divided physical quantity. Thereafter, the process proceeds to S35. When the vehicle mode status does not indicate the automatic mode (NO in S31), the process proceeds to S35 without generating the automatic driving command.

In S35, ADK 200 obtains API command other than the autonomous driving command. Then, ADK 200 transmits various API commands to VCIB 110. ADK 200 determines the power mode command based on the condition of the vehicle 1. If the determined power mode command requires a power mode change, ADK 200 may perform a retry according to the process flow of S101 to S105 illustrated in FIG. 4. The retry interval of the power mode command may be 4 seconds or more. API command transmitted in S35 corresponds to a command to the base vehicle 120. In the automatic mode, API command indicating the automatic driving command is determined by S32 to S34 and transmitted by S35. When S35 process is executed, S31 to S35 process flow ends. However, each time ADK 200 receives an API status (S22), the process flow is started.

Figure 6:
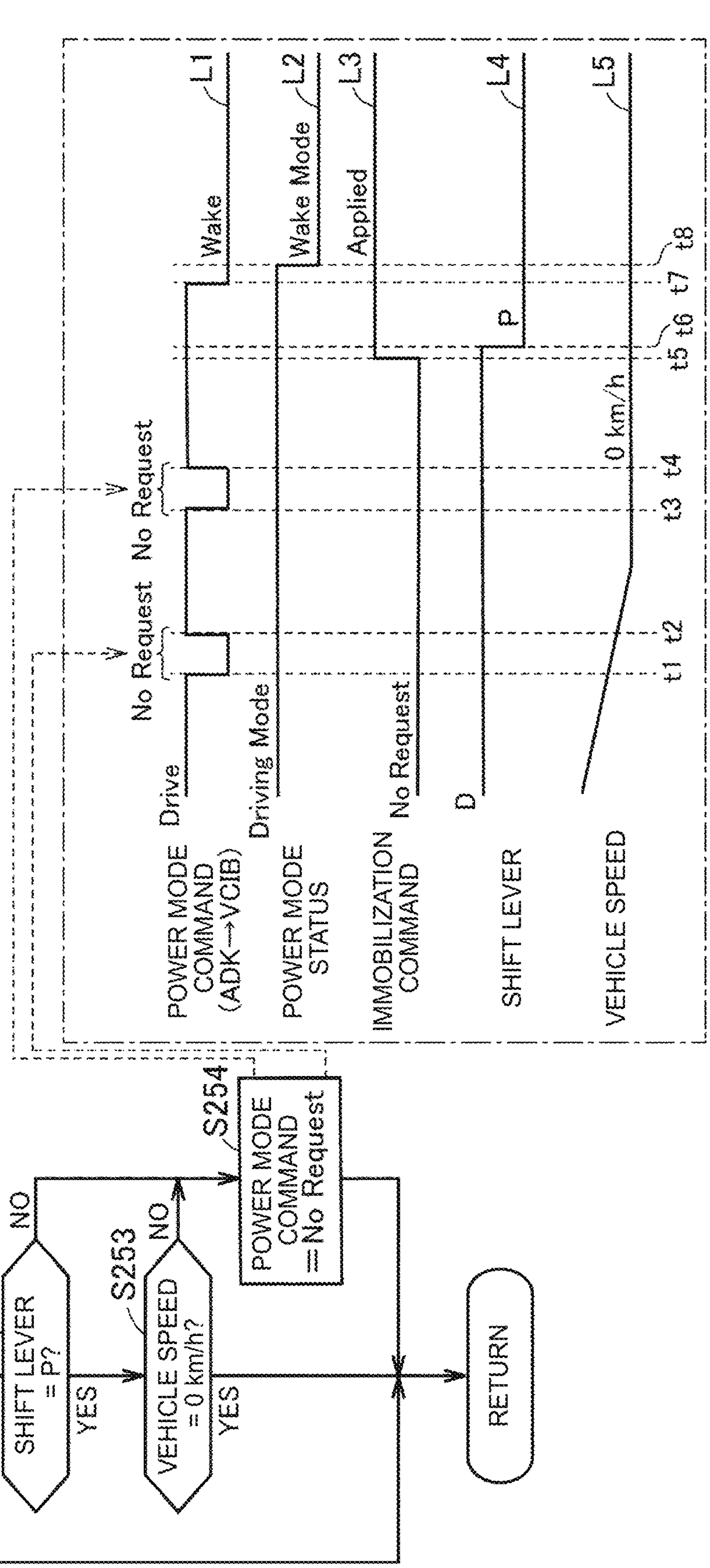
FIG. 6 is a flowchart for describing a process of determining a value of a power mode command in the power mode control method according to the embodiment of the present disclosure.

Upon receiving API command (YES in S23), VCIB 110 determines the power mode command in S24. VCIB 110 changes the power mode command set by ADK 200 if VCIB 110 does not accept the power mode command from ADK 200. FIG. 6 is a detailed view of S24. Referring to FIG. 6, VCIB 110 determines whether a Wake command is received from ADK 200 in S251. When VCIB 110 receives Wake command (YES in S251), it is determined whether or not VCIB 110 satisfies the first requirement (shift lever=P) based on the shift lever status acquired in S21 in the subsequent S252. If the first requirement is satisfied (YES in S252), in a subsequent S253, it is determined whether VCIB 110 satisfies the second requirement (vehicle speed=0 km/h) based on the vehicle speed status acquired in S21.

If both the first and second requirements are met (YES in both S252, S253), VCIB 110 accepts Wake command (value "2") from ADK 200. On the other hand, if at least one of the first requirement and the second requirement is not satisfied, VCIB 110 changes the power mode command from the value "2" to the value "0" (no request) in S254. Thereafter, the processing returns to the main routine (the processing flow shown in FIG. 5).

Referring back to FIG. 5, after determining the power mode command in S24, VCIB 110 converts the various API commands received from ADK 200 into an inner command in a subsequent S25. These transformations result in a command corresponding to API command. In a subsequent S26, VCIB 110 transmits the obtained ADK command to the base vehicle 120. When S26 process is executed, S21 to S26 process is terminated. However, each time VCIB 110 receives the most recent vehicle data from the base vehicle 120, the process flow is started.

When the base vehicle 120 receives various internal commands (ADK commands) corresponding to various API commands from VCIB 110 (YES in S13), the base vehicle 120 determines in S14 whether the received internal commands include internal commands corresponding to Wake commands. When the base vehicle 120 receives the internal command corresponding to Wake command (YES in S14), the base vehicle 120 executes the power-supply-mode control according to Wake command in S16 according to S301 to S303 process sequence shown in FIG. 4. In S301, the power mode is changed from the in-operation mode to the wake mode. Accordingly, the plurality of control devices included in the vehicle system 120*a* are stopped except for a part of the body system ECU (wake ECU).

When the internal command corresponding to Wake command is not included in the internal command (ADK command) received from VCIB 110 (NO in S14), the base vehicle 120 executes the vehicle control according to ADK command in S15. In the autonomous mode, the base vehicle 120 executes autonomous driving control according to the autonomous driving command from ADK 200. The power mode of VP 100 is maintained in the operation mode. The process then returns to the first step (S11).

The line L1 to L5 in FIG. 6 shows an exemplary operation of the vehicle 1 in the auto-mode. "t" in the time chart means timing. As indicated by the line L5, the vehicle 1 decelerates and stops in autonomous driving. As indicated by the line L1, a Wake command is transmitted from ADK 200 to VCIB 110 in each of the period t1 to t2 and the period t3 to t4. Since the first requirement is not satisfied in these periods, the power mode command is changed by S254 process. As indicated by the line L3, the immobilization command is switched from release to application in t5. As a result, as indicated by the line L4, the shift lever status is switched from D to P in t6. In the auto-mode, ADK 200 moves the shift lever 40 to change the shift range. Thus, both the first requirement and the second requirement are satisfied. Therefore, when t7 transmits Wake command from ADK 200 to VCIB 110, in response to this Wake command, the power mode status is switched from the in-operation mode to the wake mode by t8 (line L2).

In the above embodiment, ADK 200 moves the shift lever 40 to change the shift range. However, the present disclosure is not limited thereto, and the shift lever 40 may not be moved by a command from ADK 200, and may be moved only by manual manipulation by the drivers. When the shift range is changed by a command from ADK 200 and the propulsion direction status indicates P, the base vehicle 120 may request the driver to move the position of the shift lever 40 to P.

As described above, the vehicle 1 according to this embodiment includes VP (vehicle platform) 100 and autonomous driving kit (ADK) 200. VP 100 is configured to be capable of receiving a command related to autonomous driving from ADK 200. ADK 200 sends a wake command to VP 100 requesting to transition VP 100 power mode to the wake mode. VP 100 transitions to the wake mode by the wake command only when the shift lever indicates parking and the vehicle speed is 0 km/h (see FIG. 6).

The vehicle 1 having the above-described configuration can change the power supply mode based on Wake command (wake command) from the autonomous driving kit. The plurality of first control devices included in the base vehicle are stopped by the transition from the driving mode to the wake mode except for some body system control devices. Thus, the transition to the wake mode may affect vehicle control. In this regard, in the above configuration, when at least one of the first requirement and the second requirement is not satisfied, the transition to the wake mode is not executed. Even if a wake command is sent from ADK 200 when at least one of the first requirement and the second requirement is not satisfied due to a software failure (for example, a bug) of ADK 200, VP 100 is not accepted (see FIG. 6). Therefore, it is possible to prevent the transition to the wake mode from affecting the behavior of the vehicle 1. Therefore, it is easy to change the power supply mode of the vehicle 1 in an appropriate situation.

When VCIB 110 receives the wake command from ADK 200 (YES in S251 of FIG. 6), VCIB 110 (second control device) determines whether the requirements of both the first requirement and the second requirement are satisfied at the same time (S252, S253 of FIG. 6). If it is determined that both requirements are satisfied at the same time, VCIB 110 (second control device) requests the base vehicle 120 to change the power supply mode in accordance with the wake command (S26 in FIG. 5). In response to a request from VCIB 110, the base vehicle 120 (the first control device) changes the power supply mode of VP 100 (S16 in FIG. 5). In such a configuration, VCIB 110 determines whether or not the condition is suitable for transition to the wake mode. Then, when it is determined that the state is suitable for the transition to the wake mode, VCIB 110 requests the base vehicle 120 to transition to the wake mode. Therefore, it is possible to prevent the base vehicle 120 from being required to enter the wake mode in an inappropriate situation.

VCIB 110 may, in S252 of FIG. 6, instead of the first requirement (the shift lever indicates parking), determine whether the third requirement (the shift range indicates parking) is satisfied. Then, if both the second requirement and the third requirement are satisfied, VCIB 110 may accept Wake command from ADK 200. If at least one of the second requirement and the third requirement is not satisfied, VCIB 110 may change the power mode command from the value "2" to the value "0" (no request) in S254. That is, VP 100 may shift to the wake mode by the wake command only when the shift range indicates parking and the vehicle speed of the vehicle is 0 km/h.

It is to be understood that the embodiments disclosed herein are illustrative and non-restrictive in all respects. The technical scope indicated by the present disclosure is indicated by the claims rather than the description of the above-described embodiments, and is intended to include all modifications within the meaning and scope equivalent to the claims.

What is claimed is:

1. A vehicle comprising a vehicle platform configured to receive a command related to autonomous driving from an autonomous driving kit, wherein:

the vehicle platform includes a base vehicle including a plurality of first control devices and a vehicle control interface box including a second control device;

the first control devices include at least one body system control device;

the autonomous driving kit includes a third control device;

the second control device is configured to be able to communicate with both the first control devices and the third control device;

a power mode of the vehicle platform includes a sleep mode in which the first control devices and the second control device are in a power-off state, a wake mode in which the first control devices are not activated except for a predetermined body system control device and the second control device is activated, and a driving mode in which the first control devices and the second control device are in a power-on state;

the autonomous driving kit is configured to transmit, to the vehicle platform, a wake command that requests a transition of the power mode of the vehicle platform to the wake mode; and the vehicle platform transitions to the wake mode according to the wake command only when a propulsion direction status indicates parking and a vehicle speed of the vehicle is 0 km/h.

2. The vehicle according to claim 1, wherein:

when the vehicle control interface box receives the wake command from the autonomous driving kit in the driving mode, the second control device determines whether two requirements including (i) the propulsion direction status indicating parking and (ii) the vehicle speed of the vehicle being 0 km/h, are met at the same time, and the second control device requests the first control devices to change the power mode according to the wake command when it is determined that the two requirements are met at the same time; and the first control devices change the power mode of the vehicle platform in response to a request from the second control device.

3. The vehicle according to claim 1, wherein:

the vehicle further includes an activation switch that receives a user operation for switching a system between operation and stop;

when the activation switch indicates stop, the power mode of the vehicle platform is the sleep mode when the propulsion direction status indicates parking and the vehicle speed of the vehicle is 0 km/h;

when the activation switch indicates stop, no communication is performed between the autonomous driving kit and the vehicle control interface box; and when the activation switch is switched from stop to operation, the autonomous driving kit starts communication with the vehicle control interface box, and transmits the wake command to the vehicle control interface box.

4. The vehicle according to claim 1, wherein the autonomous driving kit is further configured to transmit, to the vehicle control interface box, a drive command that requests a transition of the power mode of the vehicle platform to the driving mode.

5. The vehicle according to claim 4, wherein:

the first control devices are configured to transmit vehicle information about the base vehicle to the second control device;

an application program interface (API) signal defined by an application program interface is used for communication between the second control device and the third control device;

the API signal includes an API command that indicates a command for the base vehicle and an API status that indicates a state of the base vehicle;

the second control device is configured to convert the API command from the third control device into a signal executable by the first control devices, and transmit the converted signal to the first control devices;

the second control device is configured to acquire the API status using the vehicle information from the first control devices, and transmit the acquired API status to the third control device;

the API command includes a power mode command related to control for the power mode of the vehicle platform;

the power mode command indicates one of a first value that does not request a change in the power mode of the vehicle platform, a second value corresponding to the wake command, and a third value corresponding to the drive command; and when the power mode is not changed according to the power mode command even when a predetermined time elapses after the third control device transmits the power mode command indicating the second value or the third value to the second control device, the third control device transmits, to the second control device, the power mode command that has been set to the first value and thereafter set to the second value or the third value again.

* * * * *